(12) United States Patent
Singh et al.

(10) Patent No.: US 7,181,717 B1
(45) Date of Patent: *Feb. 20, 2007

(54) METHOD AND APPARATUS FOR PLACEMENT OF COMPONENTS ONTO PROGRAMMABLE LOGIC DEVICES

(75) Inventors: Deshanand P. Singh, Mississauga (CA); Stephen D. Brown, Toronto (CA); Terry P. Borer, Toronto (CA); Chris Sanford, Toronto (CA); Gabriel Quan, Toronto (CA)

(73) Assignee: Altera Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/868,625

(22) Filed: Jun. 15, 2004

Related U.S. Application Data

(63) Continuation of application No. 10/160,474, filed on May 31, 2002, now Pat. No. 6,779,169.

(51) Int. Cl.
*H03K 17/693* (2006.01)
*G06F 17/50* (2006.01)
*G01R 31/28* (2006.01)

(52) U.S. Cl. .................. 716/16; 716/4; 716/5; 716/6; 716/9; 716/10; 703/13; 703/14; 703/15; 714/725

(58) Field of Classification Search .............. 716/1, 716/5, 6, 7, 16, 18; 714/39, 725; 703/13, 703/14
See application file for complete search history.

(56) References Cited

U.S. PATENT DOCUMENTS

| 5,960,184 | A | * | 9/1999 | Cleereman et al. ............ 716/3 |
| 5,983,277 | A | * | 11/1999 | Heile et al. ................. 709/232 |
| 6,080,204 | A | * | 6/2000 | Mendel ......................... 716/7 |
| 6,298,319 | B1 | * | 10/2001 | Heile et al. ................... 703/26 |
| 6,367,056 | B1 | * | 4/2002 | Lee ............................... 716/5 |
| 6,457,164 | B1 | * | 9/2002 | Hwang et al. ................. 716/8 |
| 6,526,559 | B2 | * | 2/2003 | Schiefele et al. ............ 716/16 |
| 6,539,536 | B1 | * | 3/2003 | Singh et al. .................. 716/18 |
| 6,560,755 | B1 | * | 5/2003 | Zhang et al. .................. 716/4 |
| 6,754,862 | B1 | * | 6/2004 | Hoyer et al. ................ 714/725 |
| 6,763,506 | B1 | * | 7/2004 | Betz et al. ..................... 716/6 |
| 6,779,169 | B1 | * | 8/2004 | Singh et al. .................. 716/16 |
| 6,973,632 | B1 | * | 12/2005 | Brahme et al. ................ 716/6 |
| 2002/0194543 | A1 | * | 12/2002 | Veenstra et al. ............. 714/39 |
| 2003/0037305 | A1 | * | 2/2003 | Chen et al. ..................... 716/4 |

* cited by examiner

*Primary Examiner*—Jack Chiang
*Assistant Examiner*—Helen Rossoshek
(74) *Attorney, Agent, or Firm*—L. Cho

(57) ABSTRACT

A method for positioning components of a system onto a target device utilizing programmable logic devices (PLDs) is disclosed. A location is determined for a user defined region on the target device that allows the system to satisfy timing constraints.

16 Claims, 13 Drawing Sheets

METHOD AND APPARATUS FOR PLACEMENT OF COMPONENTS ONTO PROGRAMMABLE LOGIC DEVICES

RELATED APPLICATION

This application is a continuation of application Ser. No. 10/160,474 filed on May 31, 2002 which has issued as U.S. Pat. No. 6,779,169.

FIELD OF THE INVENTION

The present invention relates to the field of programmable logic devices (PLDs). More specifically, the present relation relates to a method and apparatus for the placement of components onto programmable logic devices.

BACKGROUND

Programmable logic devices (PLDs) may be used to implement large systems that include millions of gates and megabits of embedded memory. The complexity of large systems often require the use of electronic design automation (EDA) tools to manage and optimize their design and placement onto physical target devices. Of the tasks required in managing and optimizing design and placement, satisfying timing constraints of a system is often the most important and the most challenging. In order to satisfy timing constraints, many iterations are often required to determine how components in logic blocks are to be grouped and where these logic blocks are placed on the target device.

Automated placement algorithms in EDA tools perform the time-consuming task of manually mapping logic blocks to physical locations on their target device. However, even state of the art automated algorithms are sometimes incapable of producing solutions that are comparable to user defined manual placement. User defined manual placement techniques are often able to identify critical sections of logic that should be grouped together in order to meet timing constraints that automated algorithms are slow to or even sometimes unable to identify. In addition, many of the state of the art EDA tools utilize a design process that involves the design of modules that make up logic blocks and the integration of the modules into a system before optimizing the system. Systems using this design process may fail to meet performance requirements despite having individual modules that meet the performance requirements before integration. Furthermore, changes made to one module may affect the performance of other modules. Re-optimizing modules to meet system performance requirements often requires additional design iterations which is undesirable.

Thus, what is needed is an improved method and apparatus for design and placement of components on PLDs. This improved method and apparatus should utilize the positive attributes of manual user placement and automated placement of components on PLDs.

SUMMARY

A method and apparatus for placement of components of a system onto programmable logic devices (PLDs) is disclosed. The method and apparatus bridges the gap between manual user placement and automated placement of components on PLDs. A user is given the capability to define logic regions that group certain components of the system together. The components may be for example, digital logic, memory devices, or other components. The user may specify a size of a logic region. The user may also specify a location for the logic region. Sizes and/or locations are determined for logic regions having no specified sizes and/or locations. The determined sizes and/or locations allow the system to meet timing constraints. According to an embodiment of the present invention, a user may create logic regions having a hierarchy of arbitrary depth.

A method for positioning components of a system onto a target device utilizing programmable logic devices according to a first embodiment of the present invention is disclosed. A location is determined for a user defined region on the target device that allows the system to satisfy timing constraints.

A method for positioning components of a system onto a target device utilizing programmable logic devices according to a second embodiment of the present invention is disclosed. An optimal size for a user defined region that includes components of the system is determined.

A method for positioning components of a system onto a target device utilizing programmable logic devices according to a third embodiment of the present invention is disclosed. A user is prompted to define a logic region that includes a subset of components of the system to be grouped together. A location is determined for the user defined region on the target device that allows the system to satisfy timing constraints.

A system designed by an electronic design automation (EDA) tool is disclosed. The system includes a first user defined region having a first plurality of components grouped together. The system includes a second user defined region having a second plurality of components grouped together.

BRIEF DESCRIPTION OF THE DRAWINGS

The features and advantages of the present invention are illustrated by way of example and are by no means intended to limit the scope of the present invention to the particular embodiments shown, and in which.

DETAILED DESCRIPTION

Figure 1:
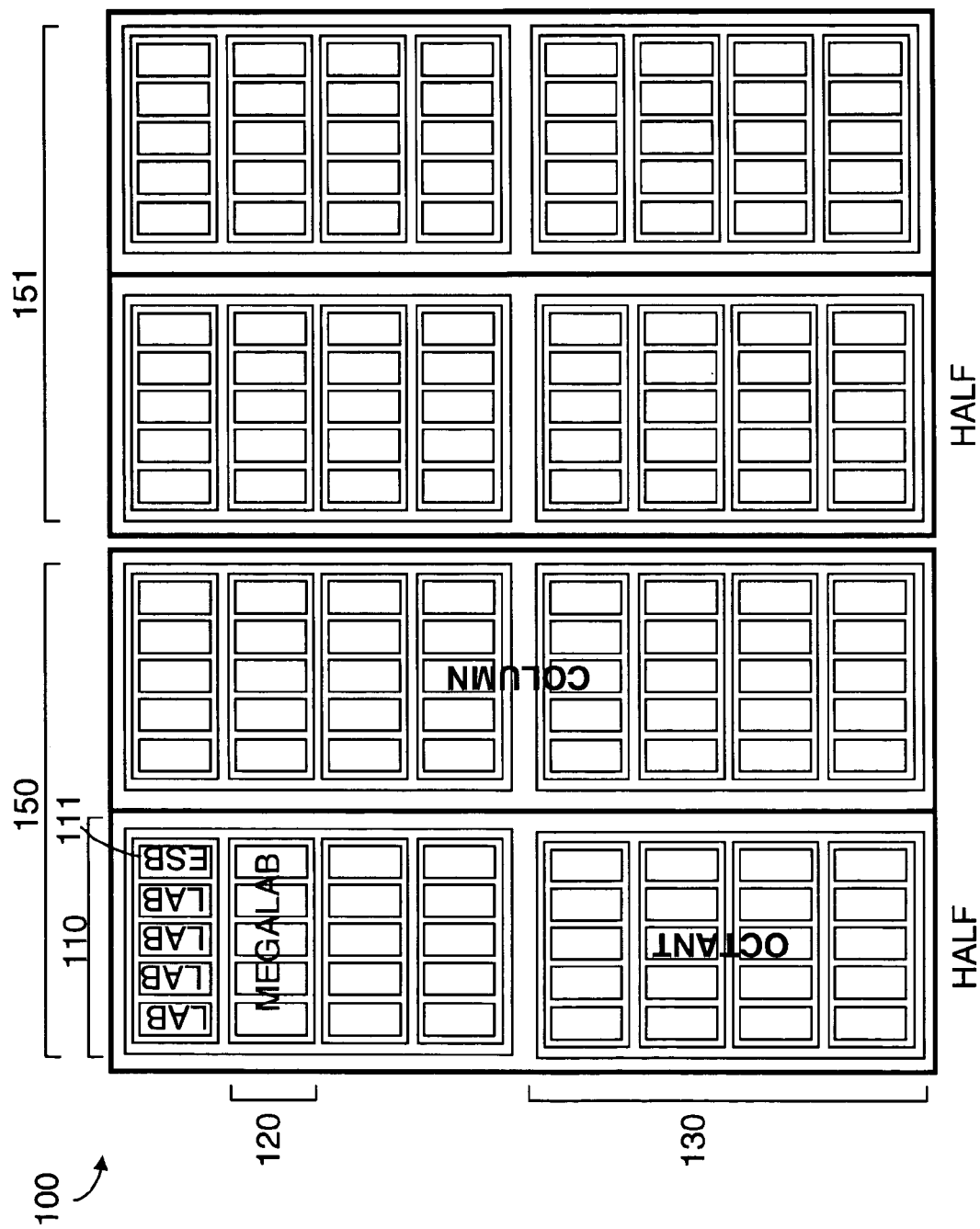
FIG. 1 illustrates a target device utilizing programmable logic devices (PLDs) according to an embodiment of the present invention.

According to an embodiment of the present invention, a user (designer) may define logic regions that group certain components of a system together. The components may be for example, digital logic, memory devices, or other components. The sizes of the logic regions may be determined by the user or by a sizing method. The placement of the logic regions may be determined by the user or by a placement method. FIG. 1 illustrates a target device 100 utilizing programmable logic devices (PLDs) according to an embodiment of the present invention. According to one embodiment, the target device 100 is a chip having a hierarchical structure that may take advantage of wiring locality properties of circuits formed therein. The lowest level of the hierarchy is a logic element (LE) (not shown). A LE includes a 4-input lookup table with a configurable flip-flop. Groups of 10 LEs form a logic-array block (LAB). A first group of LABs is shown as 110. LEs in a LAB are able to communicate with other LEs via LAB local interconnect lines (not shown).

Groups of 16 LABs and 1 embedded system block (ESB) 111 form a MegaLab. A first MegaLab is shown as 120. ESBs may be used to implement memory circuitry such as random access memories (RAMs), read only memories (ROMs), content addressable memories (CAMs), and other types of memory circuitry. Each LAB in a MegaLab is able to communicate with its adjacent neighboring LABs via the LAB local interconnect lines. Alternatively, communication may be sent via a MegaLab interconnect (not shown), which includes a set of continuous metal lines that span the width of the MegaLab. LEs within any LAB can directly drive the MegaLab interconnect. The signal then traverses the metal line to a local input line associated with the destination LAB, and then to any dependent LE.

Groups of 13 MegaLabs form an Octant. A first Octant is shown as 130. Each MegaLab in an Octant is able to communicate with other MegaLabs via a series of continuous vertical interconnect lines (V-lines) (not shown). Signals communicating across an Octant start from a source LE that directly drives a V-line. The signals traverse to the target MegaLab, switch onto the MegaLab interconnect, and make their way to the destination LE.

Two Octants are stacked vertically to form a Column. A first Column is shown as 140. Communication between Octants is made possible by a buffered switch (not shown) that connects the V-lines between two Octants together.

Groups of two Columns form a Half. A first Half is shown as 150 and a second Half is shown as 151. Continuous horizontal interconnect lines (H-lines) run across the width of the two Columns. Signals that traverse across the Half start at the source LE which can directly drive the H-line. From the H-line, the signal can drive an appropriate V-line in the target Octant and traverse its way to the destination LEs using the intra-Octant communication scheme. Two Halves are grouped side by side to form a Chip. The two Halves are connected to the buffered switch which may be used for communication between Halves.

Figure 2:
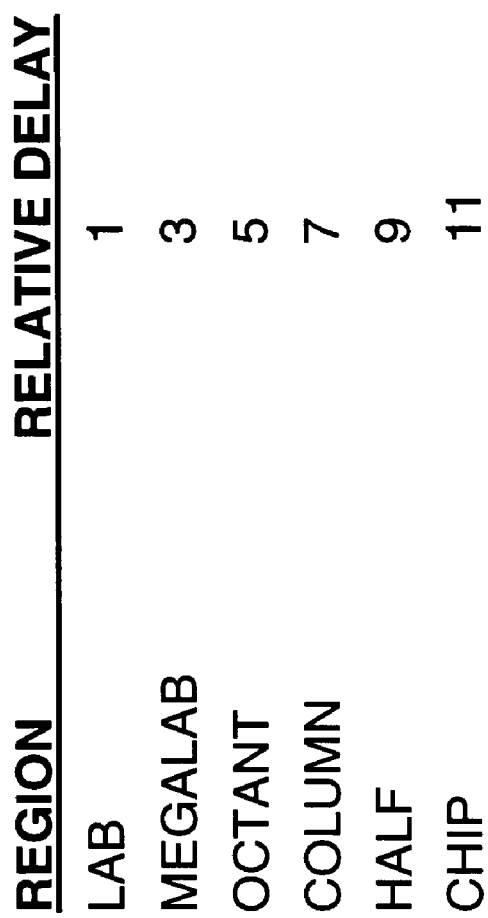
FIG. 2 is a table that illustrates relative delays for each hierarchy level of the target device shown in FIG. 1 according to an embodiment of the present invention.

Each level of the hierarchy described has delay characteristics. As communication is transmitted out of each level of hierarchy, a delay is incurred. FIG. 2 illustrates relative point-to point delays incurred at different points in the target device according to an embodiment of the present invention. As shown, as communication is transmitted to a next higher level of hierarchy, a larger delay is incurred. FIG. 1 illustrates an exemplary embodiment of a target device. It should be appreciated that the target device may include a plurality of Chips, such as target device 100 cascaded together. The target device may include programmable logic devices arranged in a manner different than that on the target device 100. The target device may also include components other than those described in reference to the target device 100.

According to an embodiment of the present invention, the user may assign a size to each logic region defined. Alternatively, the user may designate a logic region to be automatically sized. When a logic region is automatically sized, the size and shape of the logic region are determined by a sizing method according to an embodiment of the present invention. The method assumes that the logic region is to be sized such that it runs as efficiently as possible. According to an embodiment of the sizing method, a shape is found that will fit the components assigned to the logic region. The sizing method also determines the hierarchy level that the logic region will fit in.

According to an embodiment of the sizing method where sizing is performed on a logic region with predominantly logic circuits, the following technique may be used. The term $n_{LE}$ represents a number of LEs assigned to a logic region to be automatically sized.

Let $A_{LAB}$ represent the number of LEs in a LAB. According to the embodiment of the target device shown in FIG. 1, $A_{LAB}$ equals 10.

Let $A_{MLAB}$ represent the number of LEs in a MegaLab. According to the embodiment of the target device shown in FIG. 1, $A_{MLAB}$ equals 160.

Let $A_{OCT}$ represent the number of LEs in an Octant. According to the embodiment of the target device shown in FIG. 1, $A_{OCT}$ equals 2,080.

Let $A_{COL}$ represent the number of LEs in a Column. According to the embodiment of the target device shown in FIG. 1, $A_{COL}$ equals 4,160.

Let $A_{HALF}$ represent the number of LEs in a Half. According to the embodiment of the target device shown in FIG. 1, $A_{HALF}$ equals 8,320.

Let $A_{CHIP}$ represent the number of LEs in a Chip. According to the embodiment of the target device shown in FIG. 1, $A_{CHIP}$ equals 16,640.

Figure 3:
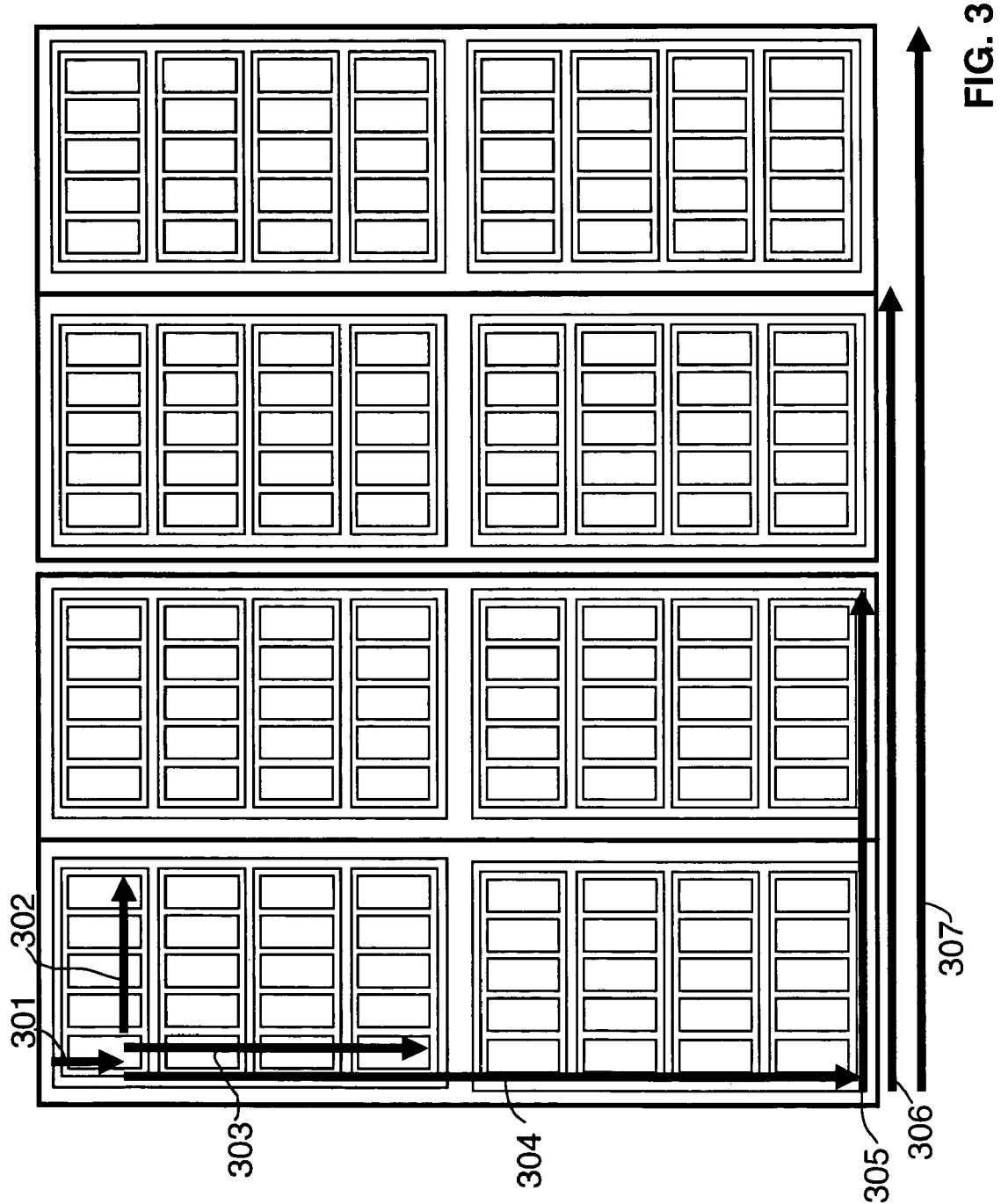
FIG. 3 illustrates the sizing of a logic region that includes predominantly logic circuits according to an embodiment of the present invention.

With reference to FIG. 3, the following process may be taken to determine a size and shape of a logic region. If $n_{LE} \leq A_{LAB}$, then the size of the logic region equals 1 LAB. The arrow corresponding to reference number 301 illustrates the direction the logic region would extend to if the preceding condition were true.

If $n_{LE} \leq A_{MLAB}$, then the size of the logic region equals $[n_{LE}/A_{LAB}]$ horizontal LABs. The arrow corresponding to reference number 302 illustrates the direction the logic region would extend to if the preceding condition were true.

If $n_{LE} \leq A_{OCT}$, then the size of the logic region equals $[n_{LE}/A_{MLAB}]$ vertical MegaLabs. The arrow corresponding to reference number 303 illustrates the direction the logic region would extend to if the preceding condition were true.

If $n_{LE} \leq A_{COL}$, then the size of the logic region equals $[n_{LE}/A_{MLAB}]$ vertical MegaLabs. The arrow corresponding to the reference number 304 illustrates the direction the logic region would extend to if the preceding condition were true.

If $n_{LE} \leq A_{HALF}$, then the size of the logic region equals 2 horizontal MegaLabs by $[n_{LE}/(2*A_{MLAB})]$ vertical MegaLabs. The arrow corresponding to the reference number 305 illustrates the direction the logic region would extend to if the preceding condition were true.

If $n_{LE} \leq A_{HALF} + A_{COL}$, then the size of the logic region equals 3 horizontal MegaLabs by $[n_{LE}/(3*A_{MLAB})]$ vertical MegaLabs. The arrow corresponding to reference number 306 illustrates the direction the logic region would extend to if the preceding condition were true.

If $n_{LE} \leq A_{CHIP}$, then the size of the logic region equals 4 horizontal MegaLabs by $[n_{LE}/(4*A_{MLAB})]$ vertical MegaLabs. The arrow corresponding to reference number 307 illustrates the direction the logic region would extend to if the preceding condition were true.

Figure 4:
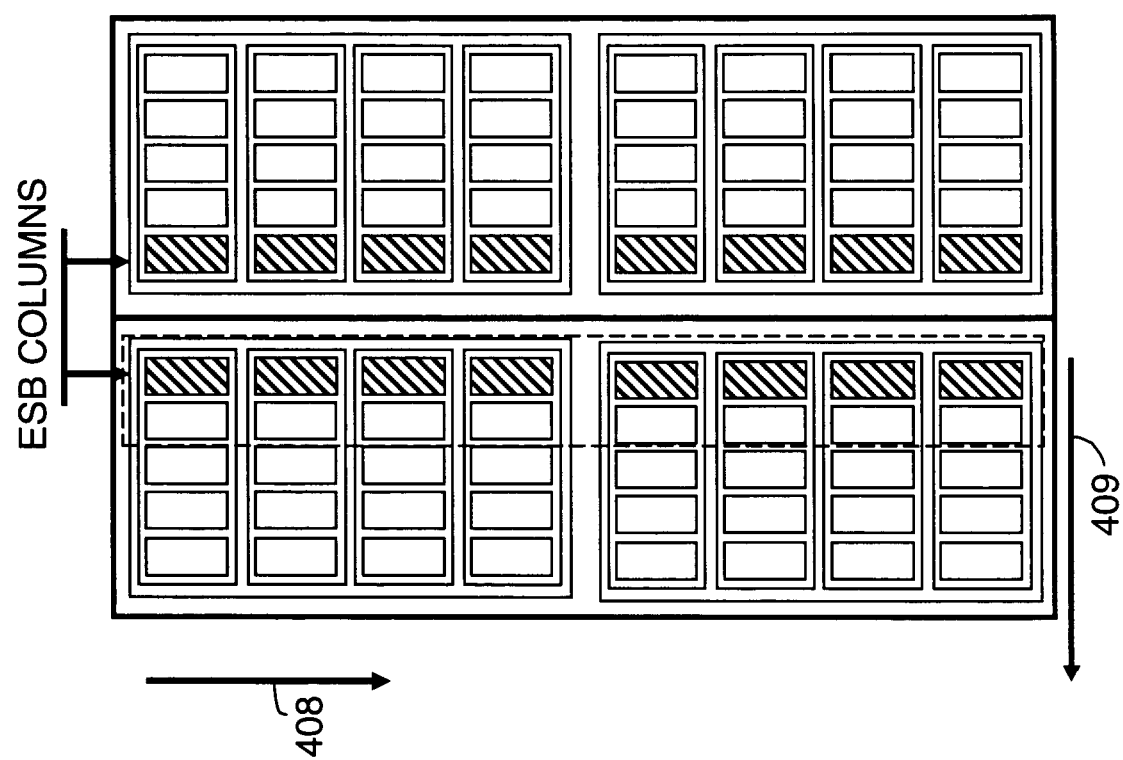
FIG. 4 illustrates the sizing of a logic region that includes predominantly memory circuitry according to an embodiment of the present invention.

According to an embodiment of the sizing method where sizing is performed on a logic region with primarily memory components, the following technique may be used. This is illustrated with reference to FIG. 4. As shown, the ESBs typically reside in a column. A size and shape of a logic region is created such that it includes a sufficient number of ESBs required for implementing the memory components. The arrow corresponding to reference number 408 illustrates the direction the logic region would extend to as more ESBs were required. The region is then extended to include just enough LAB columns to satisfy the requirement of the memory components. The arrow corresponding to reference number 409 illustrates the direction the logic region would extend to as more LEs were required.

Figure 5:
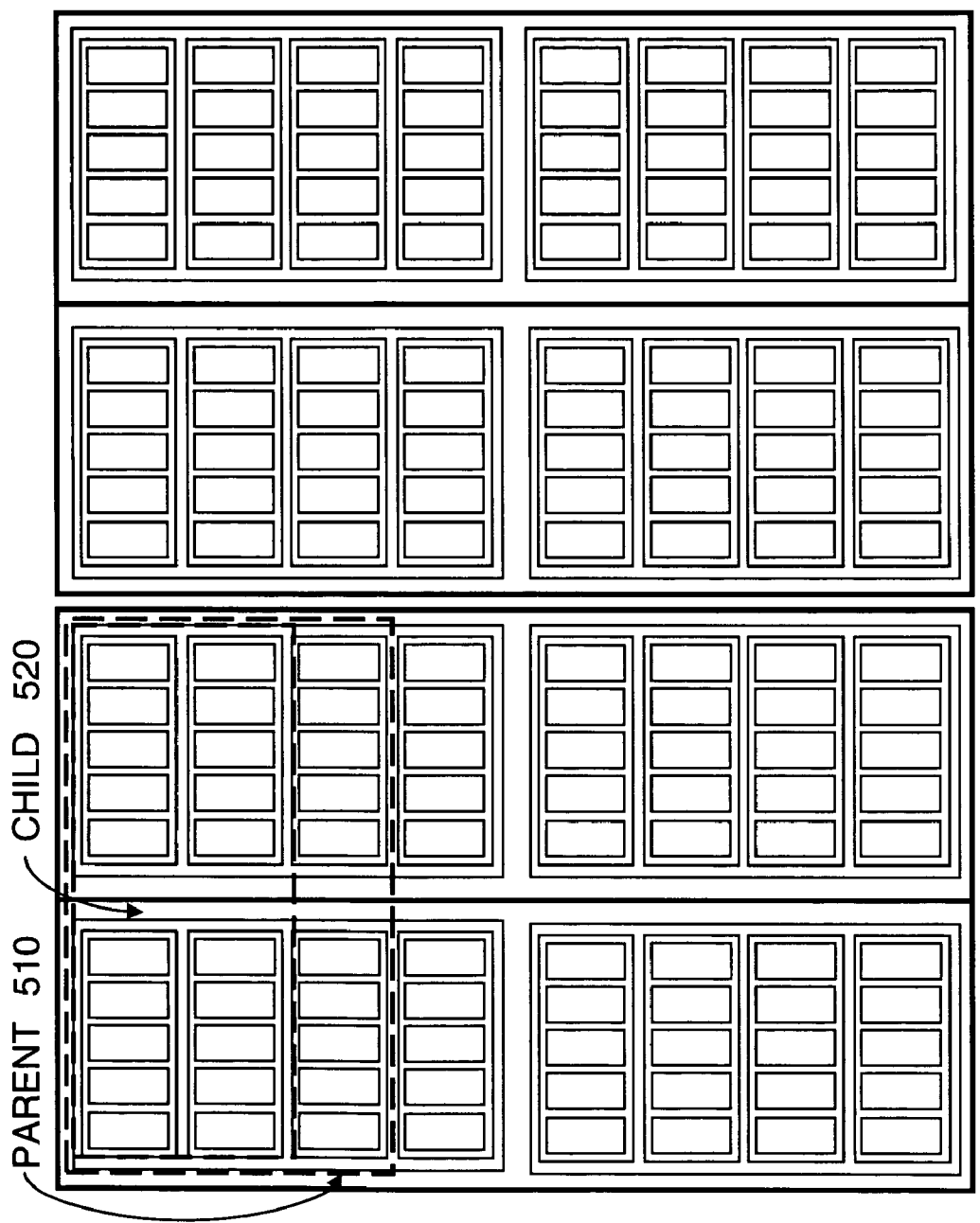
FIG. 5 illustrates an example of a fixed parent logic region constraining the sizing of a child logic region according to an embodiment of the present invention.

In the event that a user has created hierarchies that include combinations of fixed-sized and automatically sized region, the sizing method of the present invention would take into account these new constraints. FIG. 5 illustrates an example of a parent logic region 510 that constrains the size of a child logic region. The parent logic region 510 has a fixed size determined by the user. The child logic region is to be automatically sized. If the child logic region includes primarily logic circuits, it would typically be sized to occupy a single Octant. However, an Octant sized child logic region would fall outside the parent logic region 510. Thus, the preferred dimension of the child logic region is reshaped such that it fits within its parent and is shown as 520.

Figure 6:
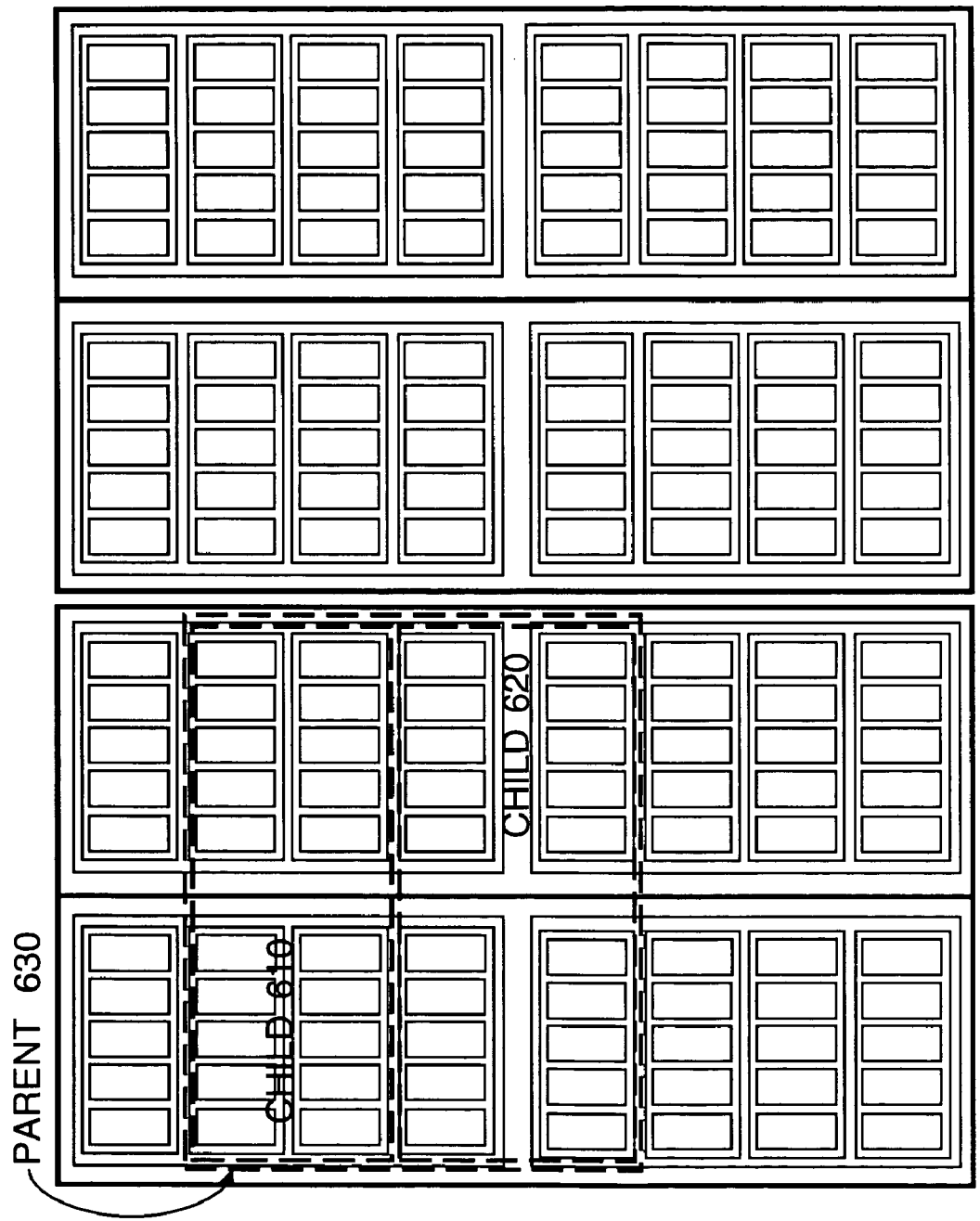
FIG. 6 illustrates an example of a fixed child logic region constraining the sizing of a parent logic region according to an embodiment of the present invention.

Similarly, FIG. 6 illustrates an example of child logic regions 610 and 620 that constrain the size of a parent logic region. The child logic regions 610 and 620 have fixed sizes determined by the user. The parent logic region is to be automatically sized. If the parent logic region includes primarily logic circuits, it would typically be sized to occupy a subset of a Column. However, the sizing constraints for the child logic regions 610 and 620 would make this assignment illegal. The preferred dimension of the parent logic region is reshaped to comply with the fixed dimensions of the child logic regions 610 and 620 and is shown as 630.

Figure 7:
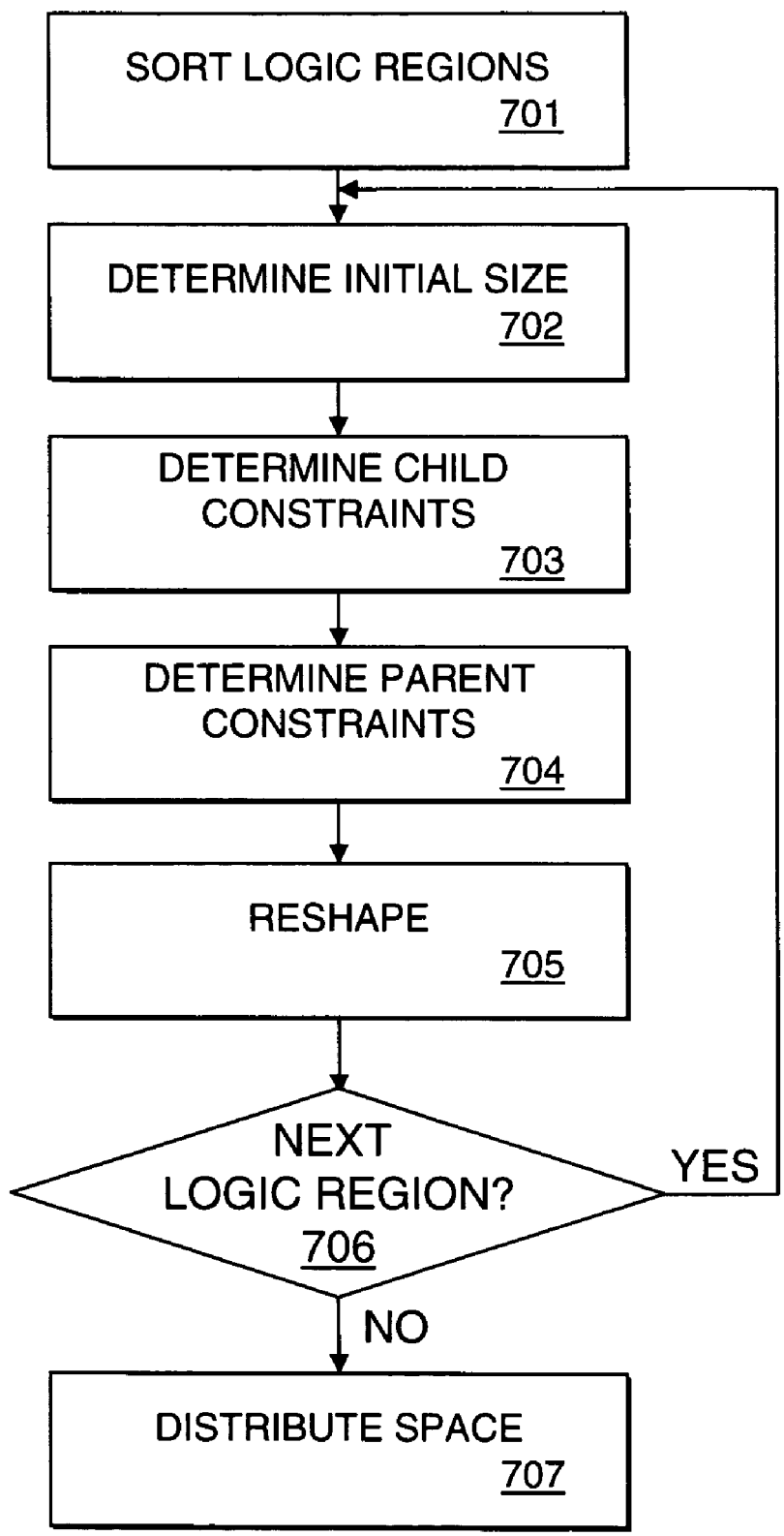
FIG. 7 is a flow chart that illustrates a method for sizing logic regions according to an embodiment of the present invention.

FIG. 7 illustrates a method for sizing logic regions according to an embodiment of the present invention. At step 701, the logic regions are sorted in reverse topological order such that child regions are ordered before the parent logic regions.

At step 702, an initial size is determined for the logic region based on the LE and ESB required for components on the logic region.

At step 703, constraints of any child logic region of the logic region are determined.

At step 704, constraints of any parent logic region of the logic region are determined.

At step 705, the initial size of the logic region may be reshaped in response to the constraints of any child and/or parent logic region of the logic region. It should be appreciated that reshaping may not be required if no constraints exist or if the constraints do not affect the initial size of the logic region.

At step 706, it is determined whether a next logic region is to be evaluated. If a next logic region is to be evaluated, control proceeds to step 702. If a next logic region is not to be evaluated, control proceeds to step 707.

At step 707, extra spaces on the target device are distributed to the logic regions evaluated.

According to an embodiment of the present invention, the user may assign a location on the target device to each logic region defined. Alternatively, the user may designate a logic region to "float" or be automatically placed. For a logic region that is to be automatically placed, the location of placement of the logic region is determined by a placement method according to an embodiment of the present invention. The method finds initial feasible locations for the logic regions that serve as a starting solution that will be iteratively optimized. In an unconstrained design flow, the initial placement may simply scatter the logic regions across the target device. According to an embodiment of the placement method, the initial placement is feasible with respect to any constraints imposed by the architecture. For example, in the target device 100 shown in FIG. 1, the placement of ESBs are only legal in certain columns of the target device 100. It should be appreciated that the initial placement of the logic regions may be determined using other methods or techniques.

After the initial placement, the logic regions are moved to different locations on the target device. The placement method operates in accordance with a plurality of guidelines. A first guideline, according to an embodiment of the placement method, is that logic regions may not overlap each other. The constrained motion imposed by the first guideline prevents the undesirable consequence of having logic regions share LEs. Although steps may be taken to perturb logic regions to ensure an overlap free solution at the end of the placement process, such moves at the end of the placement process could have an undesirable effect on inter and intra logic region timing constraints.

Figure 8:
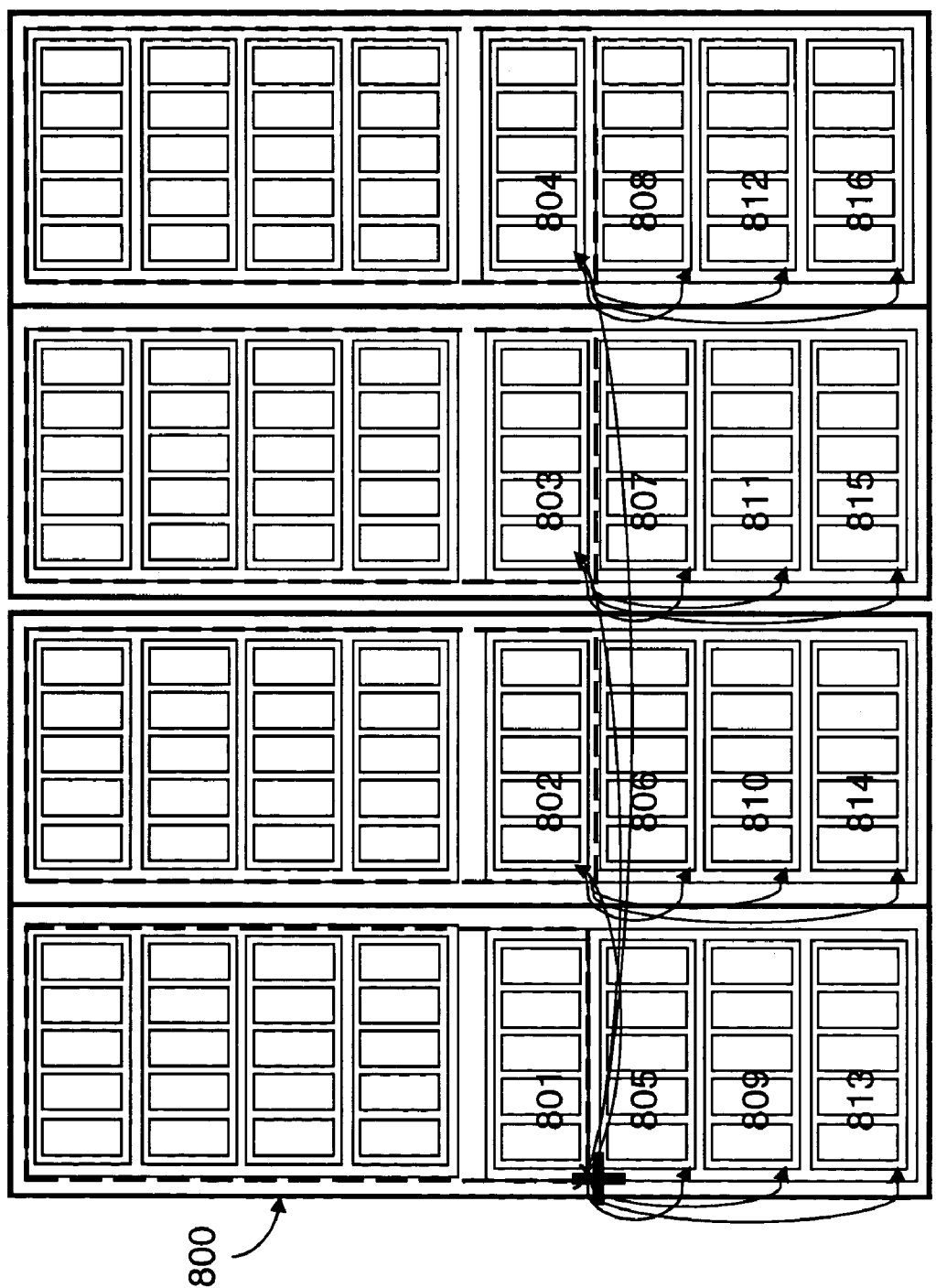
FIG. 8 illustrates a graphical depiction of the restrictions on logic region mobility according to an embodiment of the present invention.

A second guideline, according to an embodiment of the placement method, is that if a region is created within a physical Column of the target device, the logic region will not be moved to span outside a single Column of the target device. FIG. 8 illustrates the possible locations that a logic region 800 may be moved to. The origin of the logic region 800, defined by its lower left corner, may be moved from a first position denoted by 801 to a plurality of positions denoted by 802–816. The constrained motion imposed by the second guideline provides the system with better predictability that the timing requirements within a logic region will be satisfied.

Figure 9:
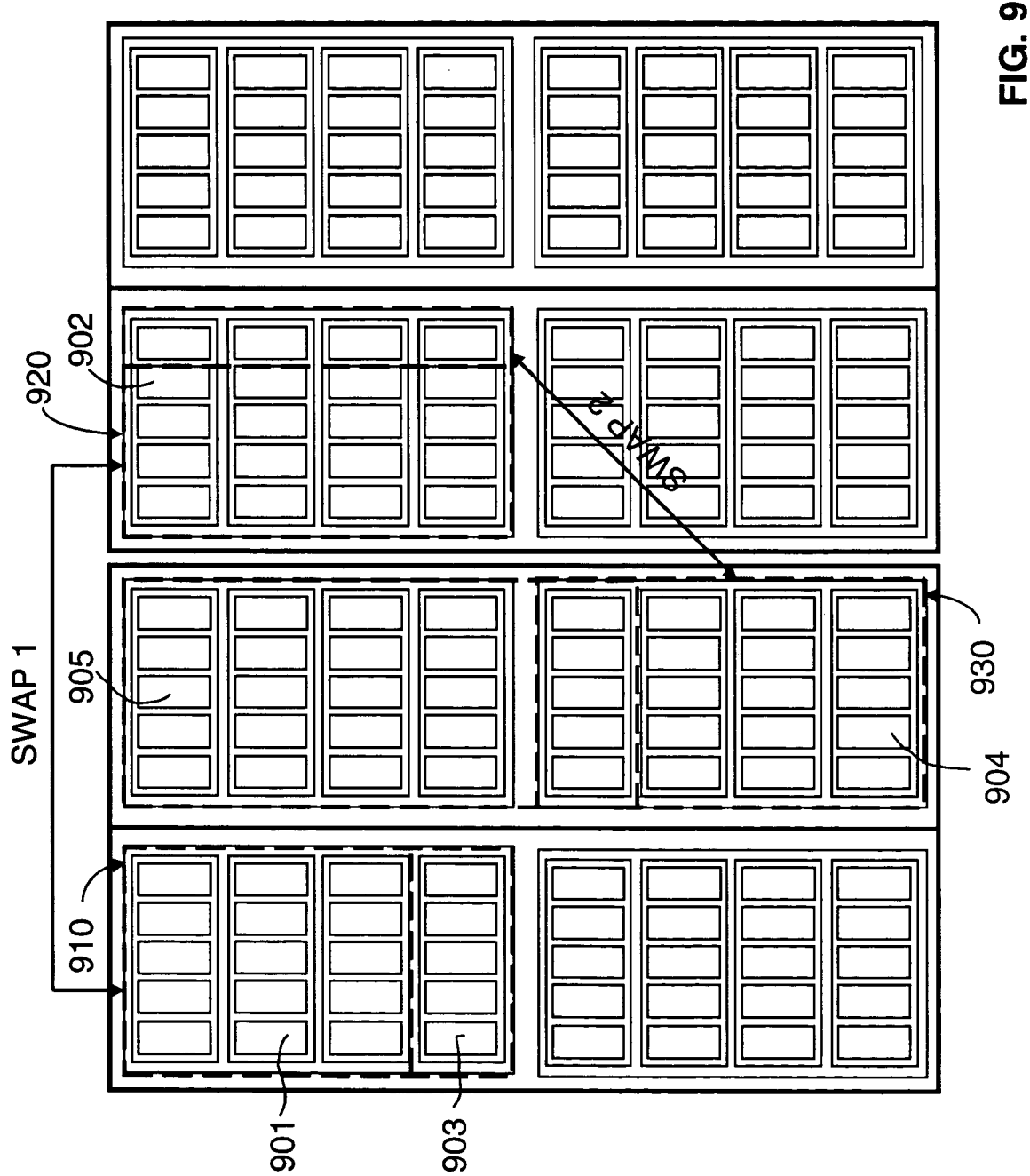
FIG. 9 illustrates graphical depictions of logic region extensions according to an embodiment of the present invention.

A third guideline, according to an embodiment of the placement method, is that a location of an extended region of a first logic region may be interchanged with a location of a second logic region given that both encapsulate all logic regions that they touch. Furthermore, both locations must be within the parent logic region of the first logic region. FIG. 9 illustrates the applicability of the third guideline. The move denoted by Swap 1 attempts to move the logic region 901 to a location occupied by 902. Notice that the locations of logic regions 901 and 902 cannot be swapped because they have different sizes. To make this move, the location of logic region 901 is extended outwards until it is the same size of logic region 902 as shown by dotted region 910. This extension also encapsulates the logic region 902 as shown by dotted region 920. The location of the extended region of the logic region 901, which also includes logic region 903, may now be swapped with the location of the logic region 902. The extension procedure of the third guideline is not always possible, however, as shown by the move denoted Swap 2. This swap attempts to move logic region 904 to the location occupied by 902. If the location of logic region 904 was extended to the size of 902 as shown by dotted region 930, it would intersect only a portion of the logic region 905.

Figure 10:
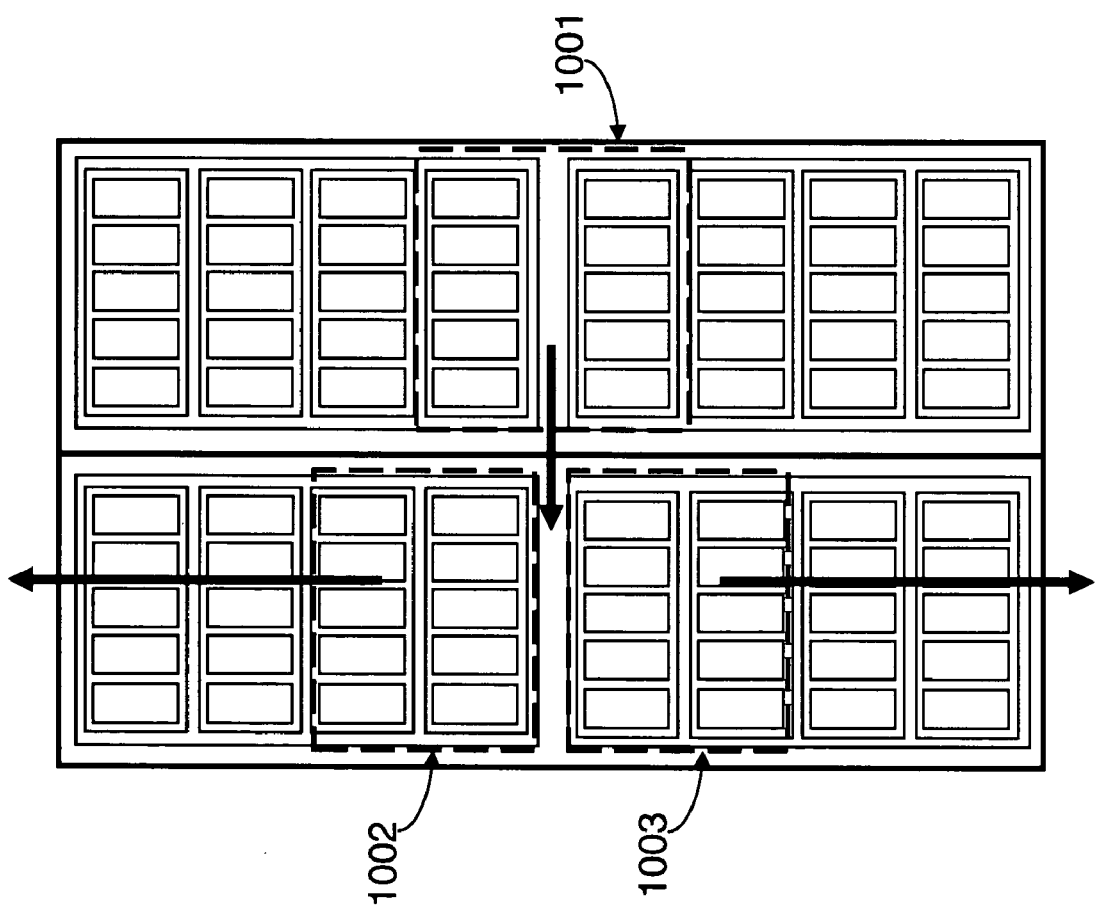
FIG. 10 illustrates a graphical depiction of bumping logic regions according to an embodiment of the present invention.

A fourth guideline, according to an embodiment of the placement method, is that a plurality of logic regions may be moved or "bumped" in order for another logic region to be moved onto their location. FIG. 10 illustrates the applicability of the fourth guideline according to an embodiment of the present invention. The logic region 1001 attempts to move to the location shared by logic regions 1002 and 1003. The fact that logic regions 1002 and 1003 block a potential move is "remembered" by the placement method. A next time a move for logic regions 1002 and 1003 is selected, the logic regions 1002 and 1003 would be biased outwards to allow the move of 1001.

Figure 11:
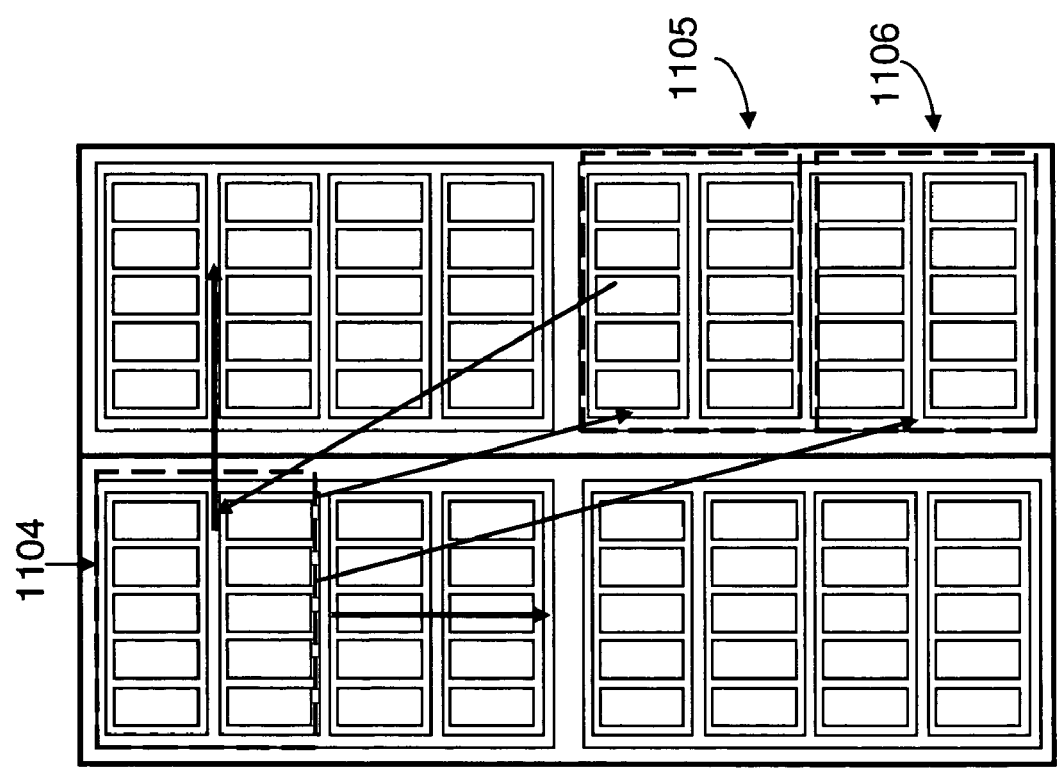
FIG. 11 illustrates a graphical depiction of a critical vector move according to an embodiment of the present invention.

A fifth guideline, according to an embodiment of the placement method, is that a logic region is moved in the direction of the sum of all incoming and outgoing critical connections to other logic regions. FIG. 11 illustrates the applicability of the fifth guideline according to an embodiment of the present invention. Logic region 1104 has a plurality of critical connections to the logic regions 1105 and 1106. A vector is computed in the direction of the sum of all incoming and outgoing critical connections from the logic region 1104. All moves of the logic region 1104 are biased in the direction of the critical vector.

After logic regions are moved to a new location, a cost function associated with the move is evaluated. According to an embodiment of the placement method, the cost function includes components that costs the move based on the logic regions' ability to meet timing constraints and on routing resources required by the logic regions. The placement algorithm may also move around components within a logic region. Thus, the cost function may cost the simultaneous movement of logic regions on a target device and components within a logic region. It should be appreciated that the cost function may utilize other parameters to cost the move.

Moves that improve the cost function are always accepted. According to an embodiment of the placement method, some moves that worsen the cost function are also accepted to allow escape from a local minima. The probability that a move that worsen the cost function will be accepted is given by $\exp[-\Delta C/T]$, where C is the cost function and T is an outside parameter. If a number of iterations or moves is sufficiently high, then the probability distribution function of the sampled states will reach equilibrium and converge to $\exp[-\Delta C/T]$. In equilibrium, high values of T imply that almost any state is equally likely to be visited. Similarly, for low values of T, the states visited are likely to be close to the globally minimum value of the cost function. T is initially set to a high value to allow the system to reach equilibrium. Afterwards, T is slowly lowered. According to an embodiment of the present invention, simulated annealing techniques are utilized to implement the placement method. Simulated annealing is a stochastic optimization technique for finding near-optimal solutions in high-dimensional spaces.

Figure 12:
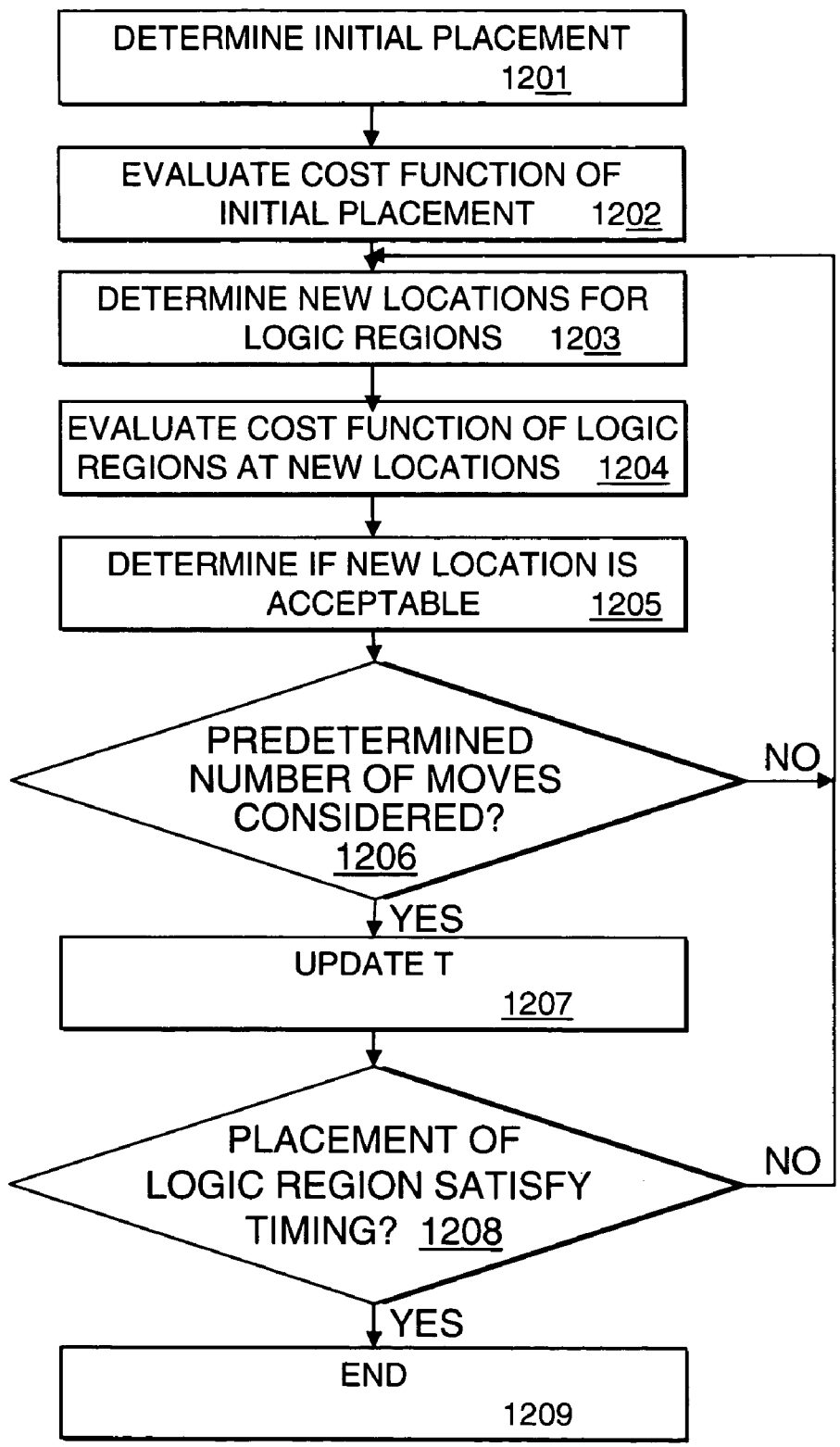
FIG. 12 is a flow chart that illustrates a method for placing logic regions on a target device according to an embodiment of the present invention.

FIG. 12 is a flow chart that illustrates a method for placing logic regions on a target device according to an embodiment of the present invention. At step 1201, determine an initial placement of logic regions of a system to be implemented on a target device.

At step 1202, a cost function associated with the initial placement is evaluated.

At step 1203, new locations are determined for the logic regions. According to an embodiment of the present invention, the new locations are determined using the placement method described. The placement method determines new locations for the logic regions based upon previous locations.

At step 1204, a cost function associated with the logic regions' new locations is evaluated.

At step 1205, it is determined whether the new locations are acceptable. According to an embodiment of the present invention, if a random value between 0 and 1 is less than $\exp[-\Delta C/T]$, the move is accepted. In this relationship, $\Delta C$ is the value of the cost function associated with logic regions at the new locations subtracted by the value of the cost function associated with logic regions at the previous locations and T is an outside value. According to an alternate embodiment of the present invention, the new locations are accepted only when they improve the cost function.

At step 1206, it is determined whether a predetermined number of iterations or moves have been considered. If the predetermined number of moves have not been considered, control returns to step 1203. If the predetermined number of moves have not been considered, control proceeds to step 1207.

At step 1207, the value T is updated.

At step 1208, it is determined whether the current placement of the logic regions satisfies timing constraints. If the current placement of the logic regions does not satisfy timing constraints, control returns to step 1203. If the current placement of the logic regions satisfies timing constraints, control proceeds to step 1209.

At step 1209, control terminates the process.

Figure 13:
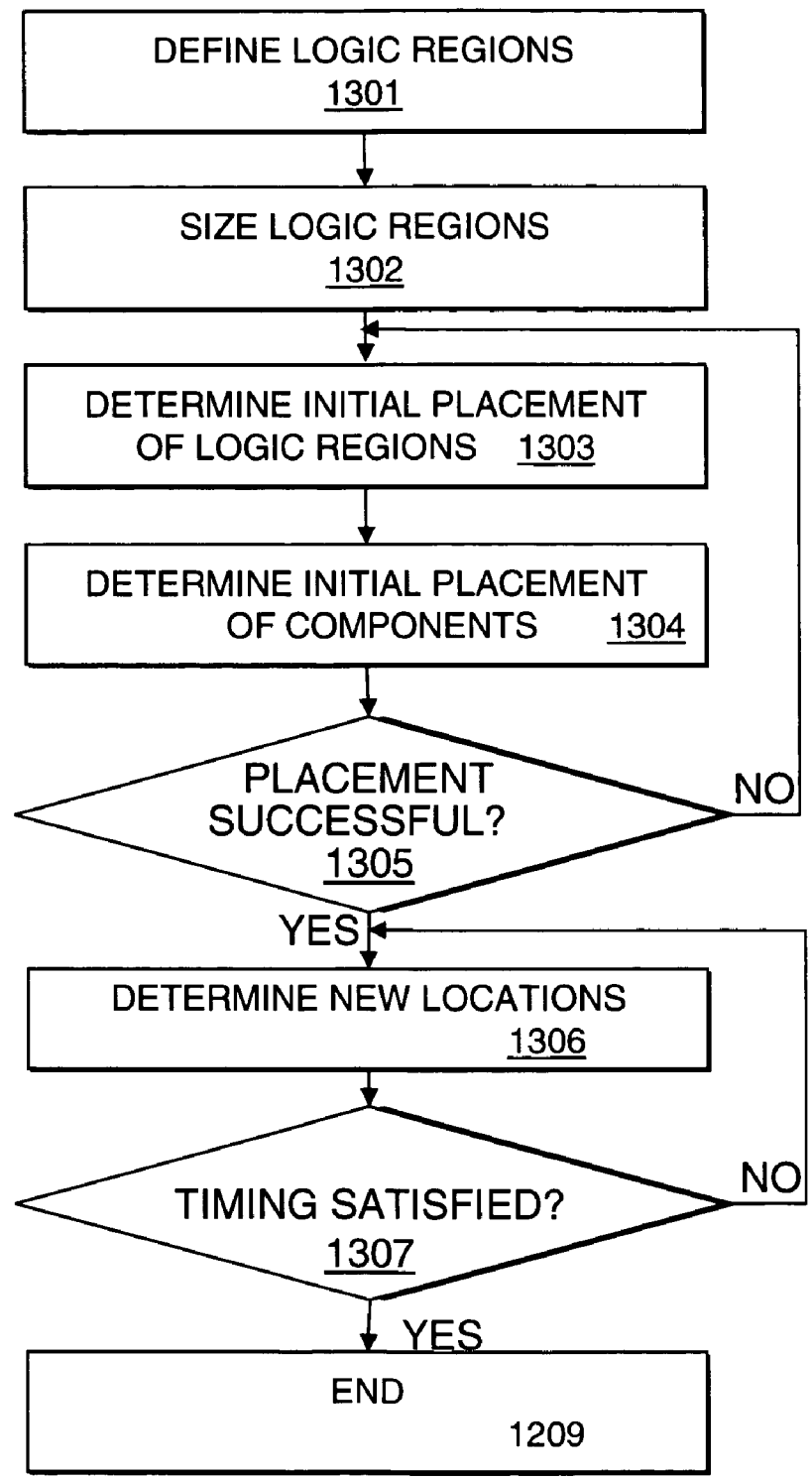
FIG. 13 is a flow chart illustrating a method for designing a target device, utilizing PLDs, for a system according to an embodiment of the present invention.

FIG. 13 is a flow chart illustrating a method for designing a target device utilizing PLDs for a system. At step 1301, define logic regions for components in the system.

At step 1302, size logic regions that are designated to be automatically sized. According to an embodiment of the present invention, this may be achieved by using the sizing method described.

At step 1303, determine an initial placement for the logic regions. The initial placement includes locations that are feasible for the components of the logic regions.

At step 1304, determine an initial placement for the components in each of the logic region.

At step 1305, it is determined whether initial placement of the components in each logic region is successful. If an initial placement of a component can not be made on the logic region, for example, due to the amount of resources available in the logic region, control returns to step 1303 where the initial placement is re-determined. If initial placement of components is successful, control proceeds to step 1306.

At step 1306, new locations of the logic regions are determined. According to an embodiment of the present invention, the new locations may be determined using the placement method described. It should be appreciated that new locations of components on each logic region may also be determined simultaneously.

At step 1307, it is determined whether the timing constraints of the system are satisfied with the positioning of the logic regions in the new locations. If the timing constraints are not satisfied, control proceeds to step 1306. If the timing constraints are satisfied, control proceeds to step 1308.

At step 1308, control terminates the process.

FIGS. 7, 8, and 12 illustrate flow charts describing methods for sizing a logic region, for placing a logic region on a target device, and designing a target device utilizing PLDs for a system. Some of the steps illustrated in these figures may be performed in an order other than that which is described. It should be appreciated that not all of the steps described are required to be performed, that additional steps may be added, and that some of the illustrated steps may be substituted with other steps.

In a preferred embodiment of the present invention, the methods described are performed in response to a processor executing sequences of instructions contained in a memory. Such instructions may be read into the memory, for example, from a computer-readable medium. In an alternate embodiment, hard-wire circuitry may be used in place of or in combination with software instructions to implement the methods described. Thus, the present invention is not limited to any specific combination of hardware circuitry and software.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for positioning components of a system onto a target device utilizing programmable logic devices (PLDs), comprising:

receiving a definition of a user defined region from a user that includes a subset of components of the system to be grouped together; and having an electronic design automation tool determine a location for the user defined region, that includes a subset of components of the system, on the target device that allows the system to satisfy timing constraints independent of instructions provided by the user regarding the location, wherein determining the location for the user defined region includes assigning an initial location for the user defined region, moving the user defined region to a new location, and evaluating a cost function associated with the user defined region in the new location.

2. The method of claim 1, wherein evaluating the cost function comprises:

determining a timing analysis of the system associated with the user defined region in the new location; and determining routing resources requirements associated with the user defined region in the new location.

3. The method of claim 1, wherein moving the user defined region comprises:

moving the user defined region from the initial location to a second location where a second user defined region resides; and moving the second user defined region from the second location to the initial location of the user defined region.

4. The method of claim 1, wherein moving the user defined region comprises:

moving both the user defined region from the initial location and a second user defined region from a second location to a third location where a third user defined region resides; and moving the third user defined region to the initial location of the user defined region and the second location.

5. The method of claim 1, wherein moving the user defined region comprises:

moving a second user defined region from a second location to a third location;

moving a third user defined region from a fourth location to a fifth location; and moving the user defined region from the initial location to a portion of the second and fourth locations.

6. The method of claim 1, further comprising determining an optimal size for a user defined region that includes components of the system.

7. The method of claim 6, wherein determining the optimal size for the user defined region comprises sizing the user defined region based on sizing constraints of any child or parent regions associated with the user defined region.

8. A method for positioning components of a system onto a target device utilizing programmable logic devices (PLDs), comprising:

receiving a definition of a user defined region from a user that includes a subset of components of the system to be grouped together; and having an electronic design automation tool determine a location for the user defined region, that includes a subset of components of the system, on the target device that allows the system to satisfy timing constraints independent of instructions provided by the user regarding the location, wherein determining the location for the user defined region includes assigning an initial location for the user defined region, assigning initial positions for the components of the system in the user defined region, and evaluating a cost function as the user defined region and the components of the systems are moved.

9. A computer-readable medium having stored thereon sequences of instructions, the sequences of instructions including instructions which, when executed by a processor, causes the processor to perform:

receiving a definition of a user defined region from a user that includes a subset of components of the system to be grouped together; and having an electronic design automation tool determine a location for the user defined region, that includes a subset of components of the system, on the target device that allows the system to satisfy timing constraints independent of instructions provided by the user regarding the location, wherein determining the location for the user defined region includes assigning an initial location for the user defined region, moving the user defined region to a new location, and evaluating a cost function associated with the user defined region in the new location.

10. The computer-readable medium of claim 9, wherein evaluating the cost function comprises:

determining a timing analysis of the system associated with the user defined region in the new location; and determining routing resources requirements associated with the user defined region in the new location.

11. The computer-readable medium of claim 9, wherein moving the user defined region comprises:

moving the user defined region from the initial location to a second location where a second user defined region resides; and moving the second user defined region from the second location to the initial location of the user defined region.

12. The computer-readable medium of claim 9, wherein moving the user defined region comprises:
   moving both the user defined region from the initial location and a second user defined region from a second location to a third location where a third user defined region resides; and
   moving the third user defined region to the initial location of the user defined region and the second location.

13. The computer-readable medium of claim 9, wherein moving the user defined region comprises:
   moving a second user defined region from a second location to a third location;
   moving a third user defined region from a fourth location to a fifth location; and
   moving the user defined region from the initial location to a portion of the second and fourth locations.

14. The computer-readable medium of claim 9, further comprising determining an optimal size for a user defined region that includes components of the system.

15. The computer-readable medium of claim 14, wherein determining the optimal size for the user defined region comprises sizing the user defined region based on sizing constraints of any child or parent regions associated with the user defined region.

16. A computer-readable medium having stored thereon sequences of instructions, the sequences of instructions including instructions which, when executed by a processor, causes the processor to perform:
   receiving a definition of a user defined region from a user that includes a subset of components of the system to be grouped together; and
   having an electronic design automation tool determine a location for the user defined region, that includes a subset of components of the system, on the target device that allows the system to satisfy timing constraints independent of instructions provided by the user regarding the location, wherein determining the location for the user defined region includes
   assigning an initial location for the user defined region,
   assigning initial positions for the components of the system in the user defined region, and
   evaluating a cost function as the user defined region and the components of the systems are moved.

* * * * *